United States Patent

Nailen

[15] 3,707,638
[45] Dec. 26, 1972

[54] ELECTRIC MOTOR UTILIZING A FERRITE STATOR OF LOW COERCIVENESS, FERRITE ROTOR OF HIGH COERCIVENESS, AND PHOTO-ELECTRIC COMMUTATION

[72] Inventor: James C. Nailen, Santa Ana, Calif.
[73] Assignee: Alumina Ferrite Corporation of America, Chatsworth, Calif.
[22] Filed: March 9, 1970
[21] Appl. No.: 17,712

[52] U.S. Cl. ............... 310/152, 310/154, 310/156, 310/164, 318/138, 318/154
[51] Int. Cl. ............... H02k 21/04, H02k 21/44
[58] Field of Search ...... 318/138, 154; 310/262, 156, 310/154, 49, 164, 152

[56] References Cited

UNITED STATES PATENTS

| | | |
|---|---|---|
| 2,101,665 | 12/1937 | Arey et al. .................. 310/44 X |
| 2,779,885 | 1/1957 | Reynst et al. ................ 310/152 |
| 2,796,571 | 6/1957 | Dunn .......................... 310/164 X |
| 2,885,645 | 5/1959 | Wennerberg .................. 310/44 X |
| 3,169,203 | 2/1965 | Lavin et al. ................. 310/156 |
| 3,230,406 | 1/1966 | Baudot ........................ 310/156 X |
| 3,364,407 | 1/1968 | Hill ........................... 318/138 |
| 3,373,328 | 3/1968 | Hobo ........................... 318/254 X |
| 3,394,295 | 7/1968 | Cory ........................... 310/156 X |
| 3,483,458 | 12/1969 | Kirk ........................... 318/138 |
| 3,531,702 | 9/1970 | Hill ........................... 318/138 |

Primary Examiner—J. D. Miller
Assistant Examiner—Mark O. Budd
Attorney—Albert L. Gabriel

[57] ABSTRACT

An electric motor with a wound stator and a permanent magnet rotor, wherein optical commutation is combined with a ferrite stator core to provide improved high speed capability and efficiency, long life, and utility in any atmosphere. A novel pole format of six poles or multiple thereof combined with electronic pulsing gives the motor a stepping capability enabling it to follow incremental tape storage, computer, or master-slave commands, as well as providing further torque and speed potential. Optional use of a ferrite rotor provides extreme longevity to the motor.

1 Claim, 7 Drawing Figures

PATENTED DEC 26 1972

INVENTOR.
JAMES C. NAILEN
BY Albert L. Gabriel
ATTORNEY

INVENTOR.
JAMES C. NAILEN
BY
ATTORNEY

ELECTRIC MOTOR UTILIZING A FERRITE STATOR OF LOW COERCIVENESS, FERRITE ROTOR OF HIGH COERCIVENESS, AND PHOTOELECTRIC COMMUTATION

BACKGROUND OF THE INVENTION

Historically, ferrites have generally not been employed as magnetic pole components of electric motors, either in the rotor or in the stator. This is in part due to the extreme hardness of ferrites, normally requiring that they be machined to configuration, but it is probably for the most part due to the fact that ferrites have a substantially lower flux density, and thus make weaker magnets than steels and various alloys which can be readily fabricated for use as electric motor poles by such conventional techniques as stamping, forming, piercing and normal cutting tool operations.

Nevertheless, ferrites have some unique qualities which in some respects make them far more desirable than steels and other conventional materials for use as pole and core members in electric motors. These qualities have been generally overlooked in the art because of the aforesaid disadvantages of ferrites, but if proper advantage is made of such qualities, the use of ferrites in electric motors enables greater improvements to be achieved in high speed capability and efficiency, longevity, utility in explosive and other atmospheres wherein electric motors normally cannot be used, in stepping capability, and otherwise.

These unique qualities of ferrites which can thus surprisingly be put to advantage in electric motors include (1) much higher coercive force in some ferrites than the best magnet materials conventionally used, such as Alnico alloys, permitting such ferrites to retain magnetism over much longer periods of time, with less diminishing of magnetic force from extreme temperatures, vibration and shock; (2) high resistivity of ferrites as compared with conventional electromagnet core and pole materials, which are generally soft steels, causing great reduction in eddy current losses which are a major adverse factor in conventional electric motors; (3) low coerciveness of some ferrites, with corresponding reduction of the force required to create or reverse a magnetic flux; and (4) wide variety of physical and magnetic properties available in ferrites enabling optimum choice of material for particular application. Other qualities of ferrites which are advantageous when employed in an electric motor according to the present invention will become apparent hereinafter.

SUMMARY OF THE INVENTION

It is accordingly an object of the present invention to provide a novel electric motor wherein a ferrite composition of low coerciveness is employed for the core and pole pieces of the stator of the motor, thereby taking advantage of the high resistivity characteristic of the ferrite material to minimize eddy current losses and thus greatly improve high speed capability and efficiency and also simplify construction by eliminating the need to laminate, the low coerciveness of the stator ferrite cooperating in the improved high speed characteristics by reducing the energy required to reverse the magnetic flux in pole pieces.

Another object of the invention is to provide an improved electric motor of the character described wherein optical commutation or other nonfrictional, electronic pulsing type of commutation is employed in combination with the ferrite stator to permit full utilization of the aforesaid high speed characteristics of the ferrite stator by eliminating brush frictional drag, brush hopping or chatter, brush inefficiency from lag or overlap and from imperfect contacting, sparking or arcing, and completely eliminating all brush wear, which can become excessive under high speed operating conditions. In general, the optical commutation employed in the present invention provides improved efficiency over conventional mechanical commutation as the speed goes up, while at the same time the ferrite stator provides improved efficiency over conventional armature materials as the speed goes up, so that the net effect of the combination of optical commutation and ferrite stator is a surprising improvement in performance as the speed goes up.

Another object of the invention is to provide an electric motor of the character described wherein a novel stator pole format consisting of six poles or a multiple thereof is combined with the optical commutation feature to give the motor a stepping capability enabling it to follow incremental tape storage, computer, or master-slave commands. The optical commutation employs a stator coil operating circuit that is normally responsive to photoelectrically generated electrical pulses; these pulses may be thought of as stepping pulses that are generated by the motor itself, as they are produced by a light chopper connected to the rotor, for synchronizing the stepping function of the stator with rotor movement. However, the same circuit can be employed for external control of the stepping by simply feeding externally generated pulses into the same circuit in place of the optically generated pulses; in this manner the rotor will follow digital pulse information, thereby opening up a wide variety of uses for the invention, including but not limited to master-slave combinations, computer and positioning drives wherein the command would be a digital signal, computer tape drives, weaving machinery, aircraft airfoil positioning, cowl flaps, and the like, or a small tachometer or generator or the like.

Another object of the invention is to provide an electric motor of the character described wherein a ferrite material of high coercive force is employed for the core and pole pieces of the rotor, thereby imparting to the motor greatly increased longevity and making the motor less vulnerable to extreme temperatures, vibration and shock.

Another object of the invention is to provide an electric motor of the character described wherein the combination of ferrite magnet members and consequent elimination of laminar magnet structures and improved resistance to corrosive materials, with optical commutation and consequent elimination of sparks and arcing, permits the motor to be run in any atmosphere, including but not limited to vacuum, explosive, normally corrosive, or hermetically sealed atmospheres.

Further and more general objects of the invention are to provide a novel electric motor of the character described which, by employing ferrite materials in combination with optical commutation in a complete departure from conventional electric motor practice, opens up a wide variety of new uses for electric motors, and provides surprising new results and benefits in the electric motor art. While a few of the advantages and new or improved uses of the invention are set forth herein, it is to be understood that many others are presently available and will become available through technical progress in various fields.

Further objects and advantages of the present invention will appear during the course of the following part of the specification, wherein the details of construction, circuit arrangements, and mode of operation of a presently preferred embodiment of the invention are described with reference to the accompanying drawings, in which:

DETAILED DESCRIPTION

Figure 1:
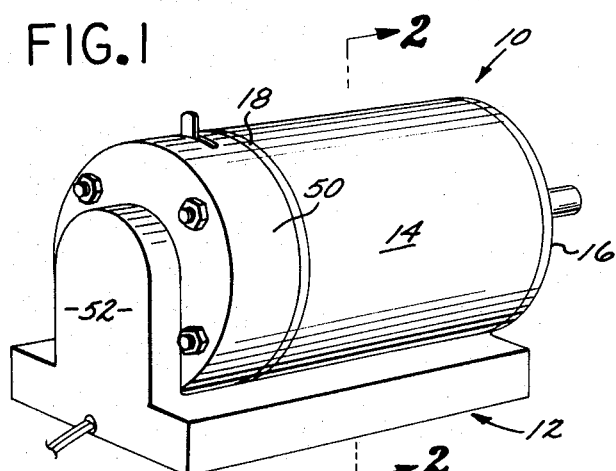
FIG. 1 is a perspective view illustrating an assembled electric motor according to the present invention.
Figure 2:
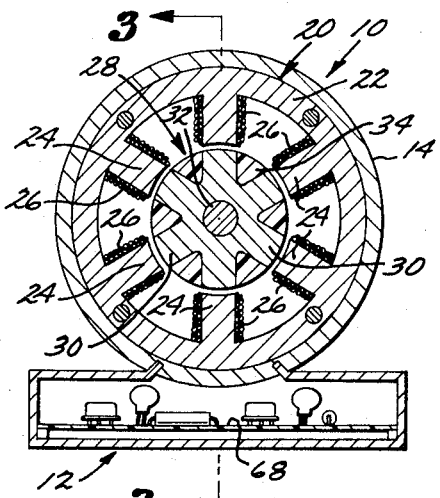
FIG. 2 is a transverse, vertical section taken on the line 2—2 in FIG. 1, illustrating the stator-rotor relationship.
Figure 3:
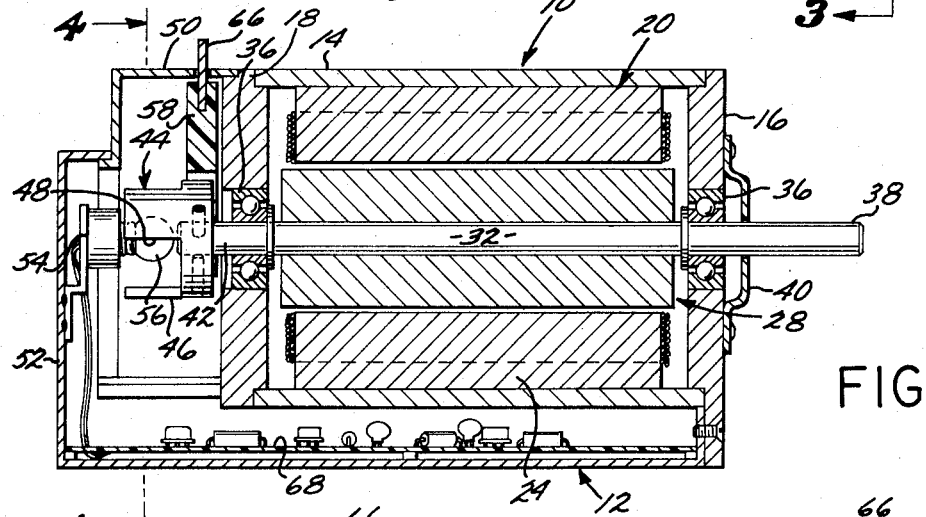
FIG. 3 is an axial, vertical section taken on the line 3—3 in FIG. 2, with portions shown in elevation, illustrating the light commutator and also the stator-rotor relationship.
Figure 4:
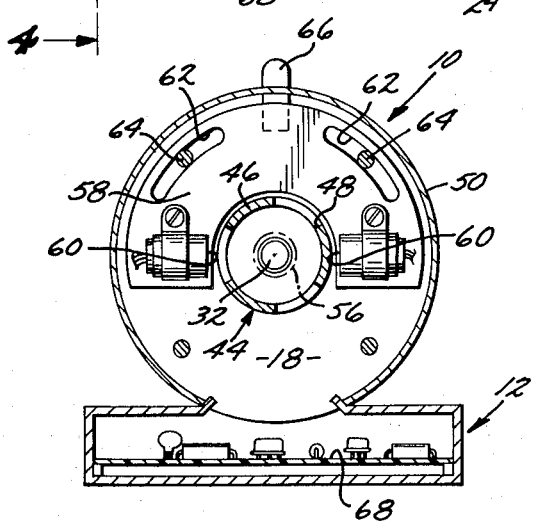
FIG. 4 is a transverse, vertical section taken on the line 4—4 in FIG. 3, further illustrating the light commutator.
Figure 5:
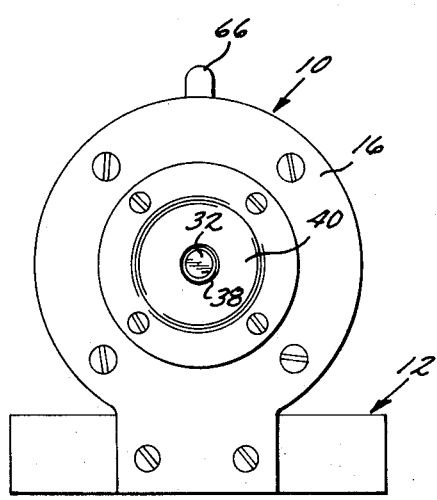
FIG. 5 is a front end view of the assembled motor, the rear end being shown in the perspective view of FIG. 1.

Referring to the drawings, and at first particularly to FIGS. 1 to 5, thereof, the form of the invention that is illustrated is a motor 10 having a base 12 with a generally cylindrical shell 14 mounted thereon. The shell 14 has front and rear end plates 16 and 18, respectively, secured thereto.

Mounted within the shell 14 between end plates 16 and 18 is the stator, which is generally designated 20, and includes an annular body portion 22 which is cylindrical, and a plurality of regularly spaced, radially inwardly projecting pole pieces 24 which, in the form of the invention shown, are six in number. Each of the poles 24 has a respective winding 26 engaged thereabout. In the present invention, the stator, including the body 22, poles 24, and windings 26, is the armature of the motor, providing the rotating magnetic fields which produce the driving force for the motor.

The body 22 and poles 24 of the stator 20 are composed of ferrite of a type which has low coerciveness and preferably also having the highest flux density available, as for example Indiana General's "Indox II," Arnold Engineering's "Ceramic No. 5," or similar ferrite material. Suitable ferrites include but are not limited to barium, strontium, and lithium ferrites.

The resistivity of the ferrite employed in the stator will be in the general order of 20 or more times the resistivity of typical armature steels that are employed in laminated armatures, thereby reducing the flow of eddy currents to a generally minimum value even without lamination. Thus, the ferrite stator need not be laminated, which greatly simplifies the fabrication thereof. The low eddy current losses due to high resistivity and the crytalline structure of the ferrite removes one of the major speed and efficiency limits of conventional electric motors. The low coerciveness of the ferrite material employed in the stator is believed to be a result of the pureness of spinel structure and in some cases lack of magneto-striction, which makes magnetic flux more readily reversible and also contributes to a more efficient and higher speed motor.

Elimination of the laminated stator structure not only makes fabrication simpler, but has other important advantages, including but not limited to lack of generated audible noise and vibration such as that normally caused by a laminated stator structure, ability to operate in a vacuum, which is difficult for laminated devices due to occluded high vapor pressure organics between the laminations, and the ability to operate in a sealed environment without oxide or insulation flakeoff which is found in laminated materials. An additional advantage in elimination of the laminated type field structure is improved stability of the designed flux field, since it cannot shift or become reoriented due to loose lamination or rivets; this can be important in the accuracy of stepping and servomotors, functions for which the present invention is peculiarly adaptable.

It is not necessary to fabricate the ferrite stator from a single piece; if desired, it can be assembled from a plurality of axially oriented blocks (of substantial thickness rather than thin as are laminations), or it can be assembled of a separate annular body portion 22 and separate pole pieces 24 which are cemented therein, without material loss of magnetic qualities.

Another advantage of the high resistivity in the ferrite stator is that the ferrite is for all practical purposes nonconductive, and does not present the usual short-to-ground problem of conventional materials. Thus, the space normally occupied by the winding forms may be replaced by additional wire material for greater torque and efficiency, without danger of shorting. If the conventional winding forms are thus omitted, it is desirable to chamfer the pole piece corners so that they will not cut the insulation on the windings.

The rotor is generally designated 28, and comprises a central core with a plurality of regularly spaced poles 30 projecting radially outwardly therefrom. A shaft 32 extends through the axial center of the rotor 28, and the core and pole structure is secured to the shaft for application of torque to the shaft. Preferably, the rotor 28 is cast or molded in epoxy resin to secure the magnet part thereof to the shaft, and to fill the slots between adjacent pole pieces 30 and thereby give the rotor a solid cylindrical shape. This reduced windage, which can be an important factor at high speeds, and in the case of a ferrite rotor magnet, adds desirable strength to the poles against centrifugal forces.

The rotor shaft 32 is journaled in suitable ball bearing races 36 supported in the respective end plates 16 and 18, the shaft 32 including a front end portion 38 which projects out through a dust cover 40 on front end plate 16 to provide a shaft extension for power takeoff.

A rear end portion 42 of the shaft projects rearwardly beyond the rear end plate 18 and is employed in connection with the light commutator as hereinafter described in detail.

The rotor 28 is a permanent magnet, and in installations where maximum torque or speed output are desired, Alnico V is the preferred permanent magnet material therefor, while Alnico VI and Alnico VIII are useful in special applications. Such materials are made by Arnold Engineering. However, if long magnetic life, durability against extreme temperatures, vibration, shock and the like, are more important than achievement of maximum torque or speed, then it is preferred to employ a permanent magnet ferrite in the rotor 28. A cobalt ferrite material is presently preferred for this purpose. The permanent magnet ferrite material has an extremely high coercive force, and it is this high coercivity that makes it generally impervious to time, temperature, shock, vibration, and also to external magnetic fields.

The rotor 28 that is illustrated in the drawings has six poles 30, which permits all adjacent poles to be alternately polarized N, S, N, S, N, S, and which also results in all diametrically opposite pairs of poles being alternately polarized N, S. Six poles or exact multiples thereof are the only geometrical configurations permitting such alternate polarization of both adjacent poles and diametrically opposite poles. By this means, and with a corresponding number of stator poles 24, all poles will produce driving torque, with stator pole switching six times for each revolution, which provides considerably greater torque than the conventional two-pole approach. This additional torque permitted by the six-pole configuration, or multiples thereof, will at least partially compensate for the reduced flux density by use of ferrite materials at relatively low speeds. At high speeds, the efficiency of the ferrite material in the stator as described in detail hereinabove much more than compensates for the lower flux density.

If desired, where the stepping function is not desired, uneven pole numbers, as for example five, seven or nine poles, or skewed poles, may be employed to enhance starting.

It will be noted that the rotor 28 illustrated in the drawings is a relatively long and slender rotor. Rotors of this type are preferred in low inertia applications such as servo, control, stepping, and positioning motors. Large diameter rotors are preferred where maximum torque or high inertia, or both, are desired, as in gyroscopes.

Mounted on the rear end portion 42 of the rotor shaft 32 is a light commutator or chopper 44 which serves the function of a light valve or gate which admits bursts of light alternately to a pair of photocells. The light commutator 44 includes three regularly spaced cylinder segments 46 coaxial with shaft 32, with intervening regularly spaced slots 48. The light commutator is housed in a rear cover shell 50 which extends rearwardly from the rear end plate 18 generally in line with the motor shell 14. A rearward end portion of the cover shell 50 is open, but in turn is covered by a rear shell portion 52 of the base which extends upwardly beyond the height of the axis of the shaft. Mounted on the inside of the rear shell portion 52 of the base is a lamp mounting bracket 54 upon which a lamp 56 is mounted for continuous illumination during operation of the motor. The lamp may be of any desired conventional type, as for example an incandescent lamp or a galium arsenide lamp.

A commutator plate 58 is arranged parallel and closely adjacent to the upper half of the rear end plate 18, to the rear of end plate 1 within rear cover shell 50, and a pair of photocells 60 is supported on the commutator plate 58. The photocells 60 are in diametrically opposed relationship, and are disposed just radially outwardly of the light commutator or chopper 44. The lamp 56 is positioned in axial alignment with the shaft 32, and is disposed in transverse alignment with the photocells 60. Commutator plate 58 has spaced, arcuate slots 62 therein which are engaged over respective pins 64 projecting rearwardly from the rear end plate 18, to provide rotational or angular adjustment of the photocells 60 relative to the stator 20 of the motor, to provide commutator adjustment for optimum performance, and also for reversing the direction of rotation of the rotor 28. An adjusting arm 66 connected to the commutator plate 58 projects upwardly through a slot in the rear cover shell 50 to facilitate this angular adjustment of the commutator plate 58.

The photocells 60 are preferably silicon photocells, which have a very fast switching time, on the order of 1 to 2 microseconds, for efficient and high speed motor performance. Alternatively, selenium photocells can be employed, although they have a much slower switching time, on the order of about one-half millisecond.

For sharp, accurate commutation, a lamp 56 having substantially a point light source may be employed. The time duration of light pulses from the lamp 56 to each of the photocells 60 is determined by the amount of arc encompassed by each of the commutator slots 48, and this can be varied according to the time duration that is desired. With the three-slot commutator as illustrated in the drawings, and single lamp 56 with diametrically opposed photocells 60, and with the commutator segments 46 each extending through substantially 60° and the intermediate commutator slots 48 also each extending through substantially 60°, the photocells 60 will be energized by light from the lamp 56 alternately, each being energized three times for each revolution of the light commutator or chopper 44. The photocells 60 operate complementary electronic circuits which in turn furnish electrical power to the field windings 26, so that the alternate energization of the photocells 60 causes corresponding reversal of the polarities of the field windings 26. In this manner, the field winding polarities are reversed six times for each revolution of the rotor 28.

In the physical form of the invention illustrated in FIGS. 1 to 5, this electronic circuitry is conveniently disposed on a printed circuit board 68 located inside the hollow base 12 of the motor.

Figure 6:
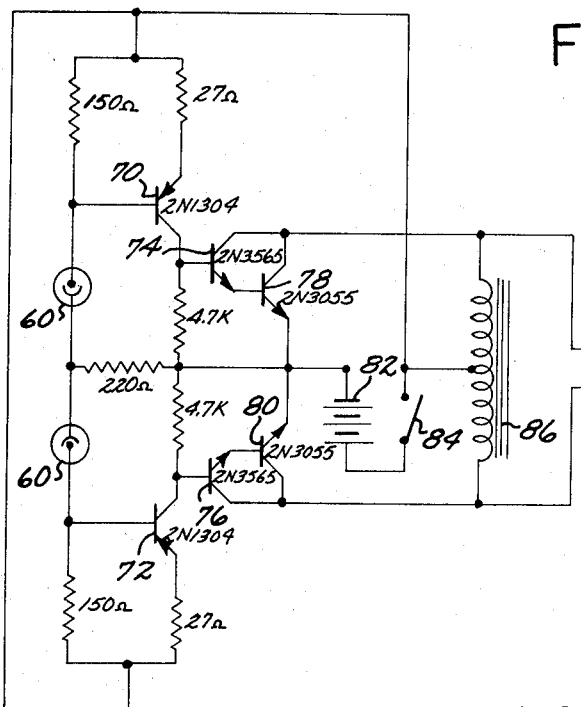
FIG. 6 illustrates one electronic circuit arrangement for driving the stator windings by electrical pulses that are either photoelectrically generated by the light commutator or fed into the circuit from some external source.
Figure 6:
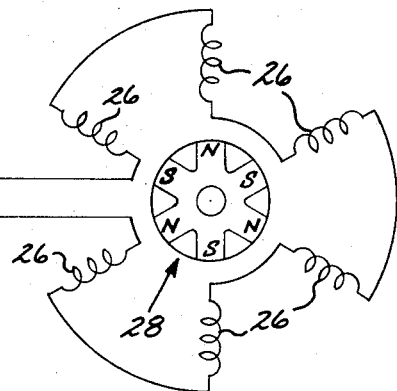

FIG. 6 is a circuit diagram illustrating one type of circuit which can be used for gating the field coil electrical energy for alternate polarity reversal in response to the alternate energization of the photocells 60, with such field coil gating correctly synchronized with the rotor position so as to induce rotation of the proper rate and direction. In FIG. 6, one side of both photocells 60 is connected to a common connection leading to ground, the other sides of the photocells biasing respective preamplifier transistors 70 and 72, which in turn are connected to respective driver amplifier transistors 74 and 76, which drive respective power transistors 78 and 80. Electrical energy is supplied to the circuit by a suitable voltage source 82 through a switch 84. The outputs of the power transistors 78 and 80 are connected to opposite sides of a center-tapped autotransformer 86 in such a way that one or the other of the power transistors 78 and 80 will be conducting, and the output of the autotransformer 86 to the motor coils 26 will be of opposite polarities for the respective conducting states of the power transistors 78 and 80.

Assuming that the light commutator or chopper 44 allows the upper of the two photocells 60 in FIG. 6 to be illuminated, its resistance drops turning on transistor 70. This in turn saturates transistors 74 and 78, lowering the collector voltage of transistor 78, and from the transformer action of autotransformer 86, the collector of transistor 80 is raised in voltage. Assuming that the voltage source 82 provides 24 volts D.C., this voltage difference between the collector of transistor 80 and the collector of transistor 78 will be approximately 22 volts. As the conductors leading to the field coils 26 are disposed across the autotransformer 86, and accordingly are connected to the collectors of transistors 78 and 80, approximately 22 volts will be applied to the motor field winding in proper phase so as to drive the rotor 28.

Assuming that the lower photocell 60 shown in FIG. 6 is illuminated, then its resistance will drop so as to turn on transistor 72, which in turn will saturate transistors 76 and 80, lowering the voltage on the collector of transistor 80 and raising the voltage of the collector of transistor 78, thereby providing approximately 22 volts in the example given of opposite polarity to the field windings 26.

While the field windings are shown as receiving their synch signal from complementary photocell preamplifiers, it is to be understood that alternatively the field winding synch signal may be provided by an alternating trigger signal from any source, as for example from a buffer storage tape, a servodrive, or a computer output or the like. Complementary circuit means similar to that illustrated in FIG. 6 can be employed, if desired, to drive the field coils pursuant to any such external synch signals. It will be apparent that motors according to the present invention are peculiarly adapted to be operated as a function of an independent variable (master) or a dependent variable (slave) to other inter-ganged motors, which is desirable in oil field and chemical processing systems, in positioning of machine tools, rudders and airfoils, and in navigational systems. One motor of this type can be very easily slaved to another motor of this type simply by applying a fraction of the outputs of a complementary pair of transistors in the field operating circuit from one motor to the inputs of a complementary pair of the transistors in the field operating circuit of the other motor.

Figure 7:
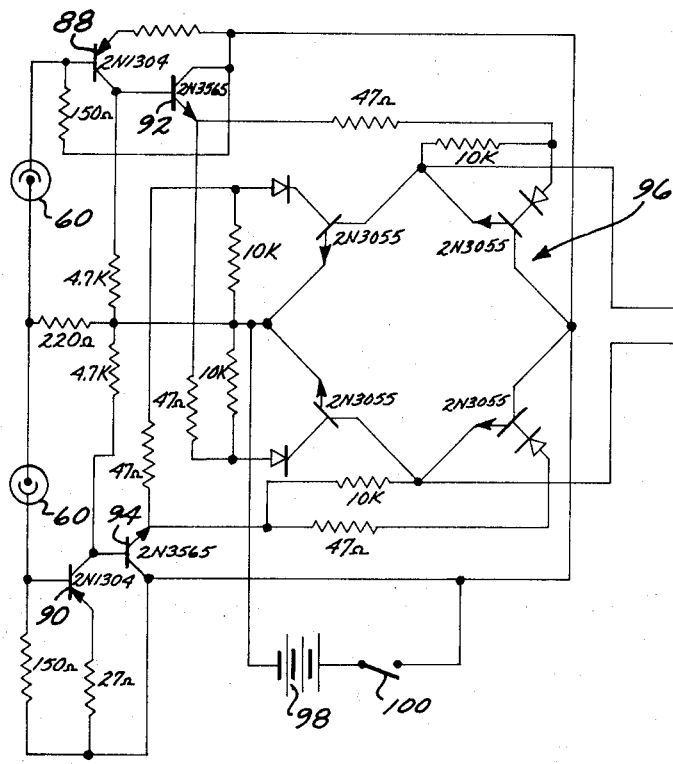
FIG. 7 is view similar to FIG. 6, but illustrating an alternative circuit arrangement.
Figure 7:
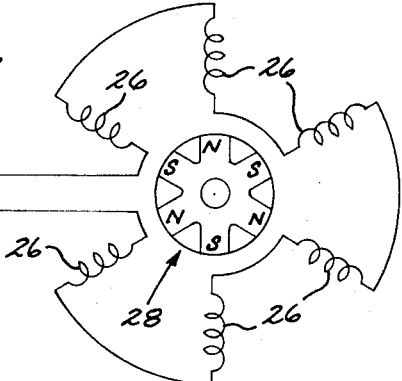

It is preferred to connect one side of each of the photocells to ground as illustrated in FIG. 6, as this cuts down electrostatic interference which can be important in aircraft applications. The use of the autotransformer 86 in the circuit illustrated in FIG. 6 provides excellent operational characteristics of the motor in the middle speed or frequency range. However, for very low speeds or frequencies, the autotransformer 86 tends to saturate, and for very high speeds or frequencies, the inductance of the autotransformer 86 can reduce efficiency. Accordingly, for uses of the motor requiring good operational characteristics at either low frequencies or high frequencies, or both, a modified complementary circuit such as that illustrated in FIG. 7 can be employed to drive the field windings, the circuit of FIG. 7 utilizing a transistor bridge network in place of the autotransformer. Otherwise, the complementary amplifier circuit arrangement in FIG. 7 is very similar to that illustrated in FIG. 6. Thus, when the upper photocell 60 of FIG. 7 is illuminated, it causes saturation of the transistors 88 and 92, while when the lower photocell 60 of FIG. 7 is illuminated, it causes saturation of the transistors 90 and 94. The four transistor bridge 96 will correspondingly present successive electrical power impulses of opposite polarity to the field windings 26. D.C. voltage source 98 and switch 100 provide energization to the circuit.

It will be noted that the motor field coils 26 are illustrated in FIGS. 6 and 7 in a series connection. This provides the best circuit impedance match at low and moderate speeds, as for example up to the region of from about 5,000 r.p.m. to about 10,000 r.p.m. However, above these speeds the current lag due to leakage inductance becomes an increasingly dominant factor. Accordingly, for relatively high speed operation, as for example at speeds on the order of from about 10,000 r.p.m. to about 100,000 r.p.m., it is preferable to arrange the coils 26 in a parallel circuit connection, which will decrease the inductance by the square of the number of coils, or with six coils by a factor of 36 to 1. It is accordingly preferable to connect the coils in series at relatively low speeds and in parallel at relatively high speeds, and if desired automatic switching can be embodied in the motor, by centrifugal or other suitable means, for automatically effecting this switching according to motor speed.

In an experimental motor made in accordance with the invention, it has been found that the present optical commutation has a very high efficiency, on the order of between about 90 percent and 96 percent, and it has also been observed that this efficiency improves somewhat as motor speed increases.

In addition to the unique cooperation of the non-frictional electronic pulsing with the ferrite stator core to provide improved high speed capability and efficiency, and with the pole format of six poles or a multiple thereof to provide the stepping capability, the optical commutation has a number of other important advantages in the present motor. Thus, it has for all practical purposes infinite operational life, as there are no wearing surfaces. Optical commutation involves no friction whatsoever, and this is an important factor at the high rotational speeds which the motor is capable of attaining. There is no audible noise or brush whine, nor is there any brush hopping or chatter due to worn brushes or untempered brush springs. Similarly, G forces have no adverse effect upon the optical commutator, as compared with ordinary brushes which can lift off of a mechanical commutator under high G loads. The optical commutation produces no sparks or arcing, thus allowing the motor to be run in any atmosphere. The ability of the present motor to run at very high speeds, combined with this ability to run safely in an explosive atmosphere, makes the motor particularly useful in dentist drills where there is an explosion hazard from the use of ether or oxygen, or both. The optical commutation produces no radio or electromagnetic interference, and thus eliminates heavy and costly noise filters which are conventionally employed in some applications of electric motors. Performance is not in any way altered by the length of operational life, and no wear compensating adjustments are required. There is no brush dust produced, and hence no problem of commutator shorts. There is no ozone produced by operation of the commutator.

While the instant invention has been shown and described herein in what is conceived to be the most practical and preferred embodiment, it is recognized that departures may be made therefrom within the scope of the invention.

I claim:

1. An electric motor which comprises operatively associated stator and rotor elements each having magnetic core means that includes six pole members or a multiple thereof in substantially circularly arranged, regularly spaced relationship, said stator and rotor pole members being in opposed driving relationship for imparting torque to said rotor, said stator element core means being composed of a ferrite material of low coerciveness and having a winding on each of its said pole members, and said rotor element core means comprising a ferrite material of high coerciveness that is permanently magnetized and substantially encapsulated in plastic, and electrical pulse input means electrically connected to said windings and adapted to furnish pulses of alternating electrical polarity to said windings, said pulse input means comprising a light commutator for pulsing said stator windings in synchronism with rotor movement, said light commutator comprising a stationary commutator portion including a generally stationary light source and photoelectric means, and a rotor commutator portion comprising a light chopper operatively disposed between said light source and said photoelectric means, said commutator portions being operatively associated in a mechanically separated, generally frictionless relationship.

* * * * *